G. H. RABENALT.
PROCESS OF PURIFYING HYDROGEN.
APPLICATION FILED APR. 4, 1910.
1,034,646.
Patented Aug. 6, 1912.
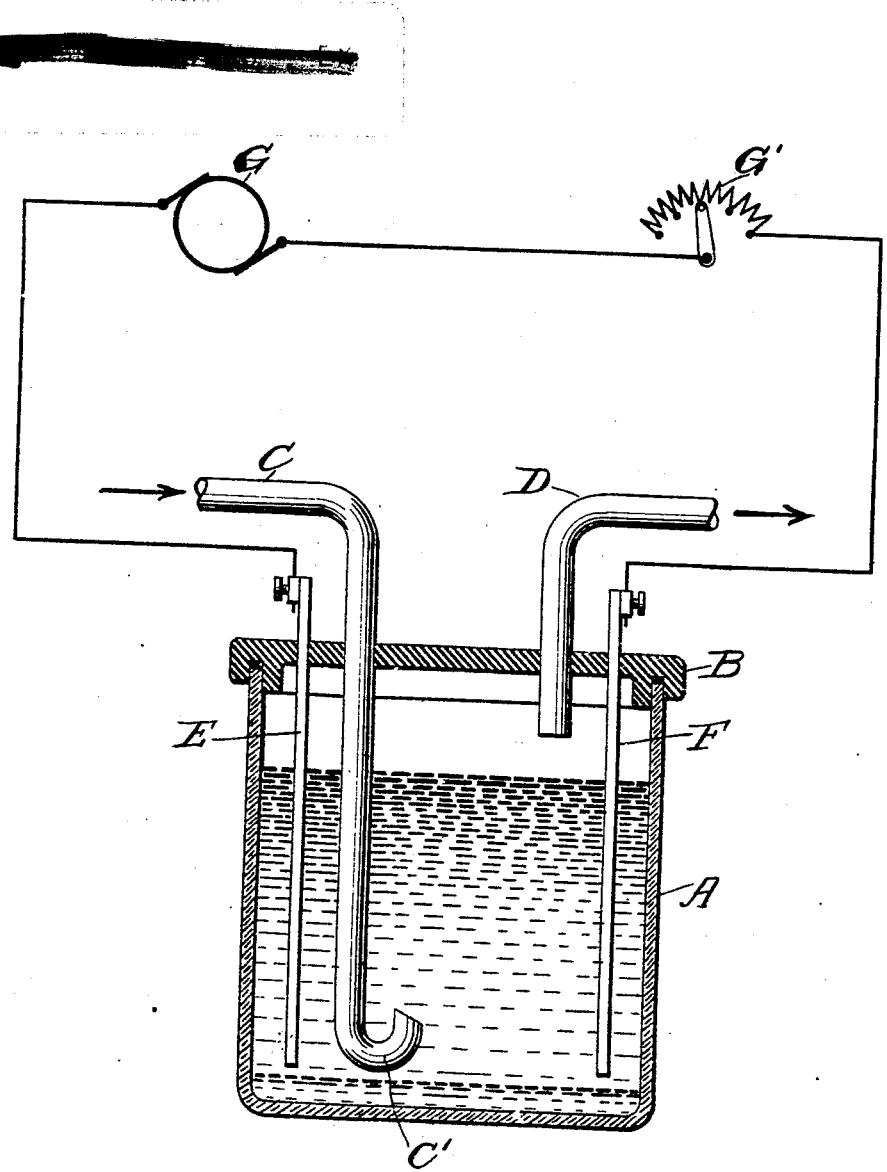
WITNESSES:
INVENTOR
Gustav H. Rabenalt
BY
Augustus B. Stoughton
ATTORNEY.

UNITED STATES PATENT OFFICE.

GUSTAV H. RABENALT, OF DOVER, NEW JERSEY.

PROCESS OF PURIFYING HYDROGEN.

1,034,646.  Specification of Letters Patent.  Patented Aug. 6, 1912.

Application filed April 4, 1910. Serial No. 553,355.

*To all whom it may concern:*

Be it known that I, GUSTAV H. RABENALT, a citizen of the United States, and a resident of Dover, State of New Jersey, have invented certain new and useful Improvements in Processes of Purifying Hydrogen, of which the following is a specification accompanied by a drawing.

This invention relates to a process for the purification of hydrogen and has for its objects to eliminate the impurities from the hydrogen in a continuous way which is economical and commercially successful.

Hydrogen which has been generated from iron or the iron group by the action of a suitable reagent, as for instance, sulfuric acid, contains hydrogen sulfid, which is objectionable in welding and other processes, owing to the presence of the sulfur.

I have discovered a process whereby hydrogen as generated may be continuously passed into a washing solution which at the same time forms an electrolyte, so that the solution is continuously regenerated electrolytically.

The figure represents diagrammatically, apparatus for carrying out my process.

Referring to the drawing, A represents a vessel preferably of glass, having a tight cover B through which projects the inlet tube C extending nearly to the bottom of the vessel and having an upwardly turned end C'. The outlet tube D for the purified hydrogen also extends through the cover and terminates below the cover as shown.

E and F represent electrodes preferably of retort carbon, although other suitable substances may be used. The electrodes are suitably connected with the sources of supply G and include in the circuit a rheostat G'.

In the vessel A I place a solution of iodin in a suitable solvent, such as an aqueous solution of potassium iodid, or any other suitable metallic iodid. This solution may consist of ten parts of iodin, twenty parts of potassium iodid and about one hundred parts of water. Other suitable proportions may be found, but I have found that an approximately 10% solution of iodin is suitable for my purposes. This percentage may be varied as low as 1% and as high as 50% of iodin. The hydrogen is passed into the vessel A and the hydrogen sulfid combines with the iodin to form hydriodic acid. The sulfur is precipitated in powdered form which remains in suspension or which may collect at the bottom of the vessel. By turning the lower end C' of the inlet tube C upwardly, as indicated in the drawing, agitation of the lower portion of the solution is avoided near the bottom of the vessel, so that the sulfur may collect on the bottom of the vessel.

The reaction is as follows:

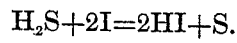

$$H_2S + 2I = 2HI + S.$$

As the sulfur becomes eliminated, the iodin is being used up, and the solution becomes exhausted. The hydriodic acid if sufficiently concentrated is volatile, and would pass off with the hydrogen, which is objectionable. To restore the strength of the wash solution and prevent the volatilization of the hydriodic acid, I resort to electrolysis of the wash solution, whereby the hydriodic acid is decomposed into its elements hydrogen and iodin, the hydrogen passing off through the outlet tube D, and the iodin dissolving in the wash solution, ready to react with a new supply of hydrogen sulfid. If the current is too strong, the potassium iodid is decomposed, but the potassium and iodin immediately again unite. To avoid decomposition of the potassium iodid the current strength is regulated, so that the solution at all times shows a substantially brownish color. The strength of current should be sufficient to set free iodin at about the same rate that iodin is used in decomposing hydrogen sulfid. This will depend upon the proportion of hydrogen sulfid present in the hydrogen to be purified and upon the rate at which the hydrogen is passing through the solution but, for example, it may be said that if the iron used in the generation of the hydrogen contains 0.1% of sulfur and the hydrogen is passing through the solution at about the rate of six cubic feet per hour, the current's strength should be about three-fourths of an ampere.

I claim and desire to obtain by Letters Patent the following:

The process substantially as herein described of purifying hydrogen, which consists in passing hydrogen into a solution of iodin in a suitable solvent and at the same time passing an electric current through said solution.

In testimony whereof I have signed this specification in the presence of two subscribing witnesses March 9, 1910.

GUSTAV H. RABENALT.

Witnesses:
E. VAN ZANDT,
M. M. RIEMANN.

Copies of this patent may be obtained for five cents each, by addressing the "Commissioner of Patents, Washington, D. C."